Sept. 15, 1970   R. J. BROCKWAY ET AL   3,528,450

MODULAR SERVO VALVE

Filed Feb. 12, 1969   2 Sheets-Sheet 1

INVENTORS
RICHARD J. BROCKWAY
DAVID G. ELDRIDGE

ATTORNEY

Sept. 15, 1970 R. J. BROCKWAY ET AL 3,528,450
MODULAR SERVO VALVE
Filed Feb. 12, 1969 2 Sheets-Sheet 2

INVENTORS
RICHARD J. BROCKWAY
DAVID G. ELDRIDGE
BY
ATTORNEY

United States Patent Office 3,528,450
Patented Sept. 15, 1970

3,528,450
MODULAR SERVO VALVE
Richard J. Brockway, Amherst, and David G. Eldridge, Nashua, N.H., assignors to Sanders Associates, Inc., Nashua, N.H., a corporation of Delaware
Filed Feb. 12, 1969, Ser. No. 798,704
Int. Cl. F16k 11/07
U.S. Cl. 137—269
18 Claims

ABSTRACT OF THE DISCLOSURE

The servo control valve includes a number of identical modules connected together to control the flow of fluid under pressure to and from a load actuator. The flow capability of the valve is determined by the number of modules used. A single control mechanism actuates all of the modules in response to an input signal and also includes manifolds by which the valve is connected to the fluid source and to the load actuator.

BACKGROUND

Field of the invention

This invention relates generally to servo control valves and particularly to a modular construction of such valves by which the flow capacity may be selected simply by choosing an appropriate number of modules to be assembled to form the complete valve.

Prior art

The flow of fluid to a hydraulic actuator is usually controlled by a servo control valve which meters fluid to and from the actuator in accordance with an input signal. Hydraulic actuators are made in a wide variety of sizes and operating rates to accommodate the many different tasks they are assigned to perform. This range of sizes has in turn required a correspondingly large variety of sizes of servo valves to operate them. In general, each different actuator size and/or operating rate has required a different servo valve with a specifically selected and designed flow capability. Maintenance of these valves thus requires that a large number of spare parts be stocked. A reduction in the variety of servo valves and/or their component parts would, obviously, result in large savings to anyone using large numbers of them.

It is a general object of the present invention to provide an improved servo control valve.

A more specific object is to provide a servo control valve the flow capability of which can be varied.

Another object is to provide a modular servo control valve which can be adjusted to meet various flow capability requirements by suitably selecting the number of modules which are assembled to form the complete unit.

Another object is to provide a servo control valve in which a single control mechanism is suitable for controlling either few or many flow control modules.

SUMMARY OF THE INVENTION

Briefly stated, a servo valve assembly incorporating the invention comprises a number of valve modules each including an axially moveable spool cooperating with the usual ports. As many modules as necessary to provide the desired flow capability are coupled to each other and to a single control mechanism which controls them all simultaneously. The flow capability of the assembly can be changed at any time by adding or deleting modules as necessary.

DESCRIPTION OF DRAWING

For a clearer understanding of the invention, reference may be made to the following detailed description and the accompanying drawing, in which.

DESCRIPTION OF PREFERRED EMBODIMENT

Figure 1:
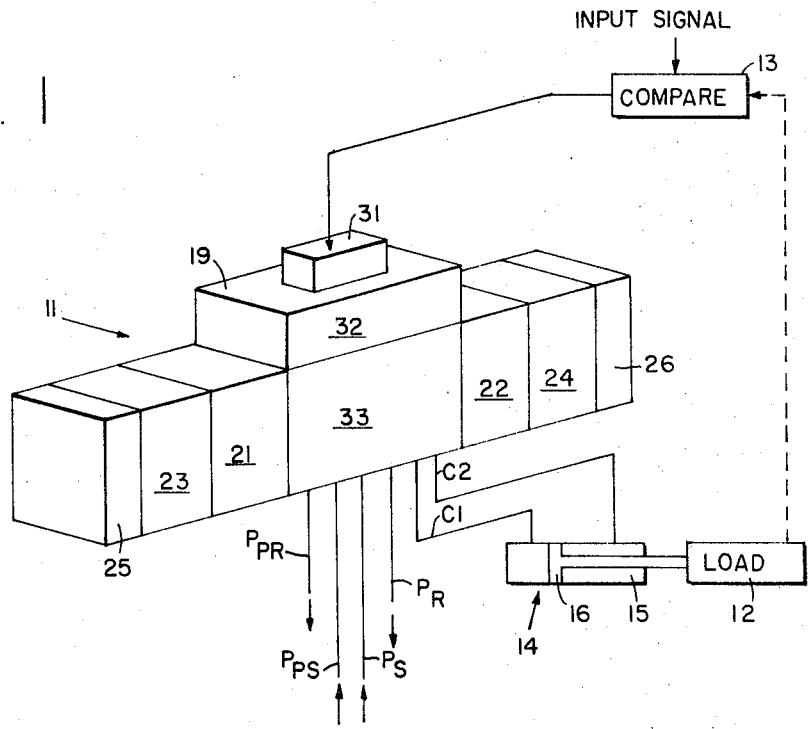
FIG. 1 is a schematic block diagram of a control system including a valve in accordance with the invention.

Referring first to FIG. 1, there is shown a valve, indicated generally by the reference character 11, incorporated into a system for positioning a load 12 in accordance with an input signal. A signal representing the actual position of the load 12 is compared with the input signal in a circuit 13 which, in response to a difference in the two signals, generates an error signal which is applied to the valve 11. The valve 11 is connected by hydraulic lines $P_s$ and $P_r$ to the supply and return portions of a source (not shown) of fluid pressure. The valve 11 is also connected through lines $P_{ps}$ and $P_{pr}$ to the supply and return portions of another source (not shown) of pilot fluid pressure. Finally, the valve 11 is connected by control lines $C_1$ and $C_2$ to an actuator 14, shown schematically as comprising a cylinder 15 and a piston 16, which is mechanically connected to drive the load 12. The valve 11 operates in response to the applied error signal to connect the lines $P_s$ and $P_r$ to the lines $C_1$ and $C_2$ in the appropriate sense to drive the load in the desired direction and reduce the error signal to zero.

More particularly, the valve 11 comprises a centrally disposed control mechanism 19 to which the previously mentioned hydraulic lines are connected and which includes a force motor and pilot stage, all as will be more fully explained. The valve 11 also includes a number of modules 21, 22, 23 and 24, preferably identical and preferably disposed in equal numbers on opposite sides of the control mechanism 19. As will be more fully explained, each module includes a spool cooperating with suitable ports. The flow capability of the valve 11 is determined by the number of modules used. A pair of end caps 25 and 26 on opposite ends of the valve complete the assembly.

Figure 2:
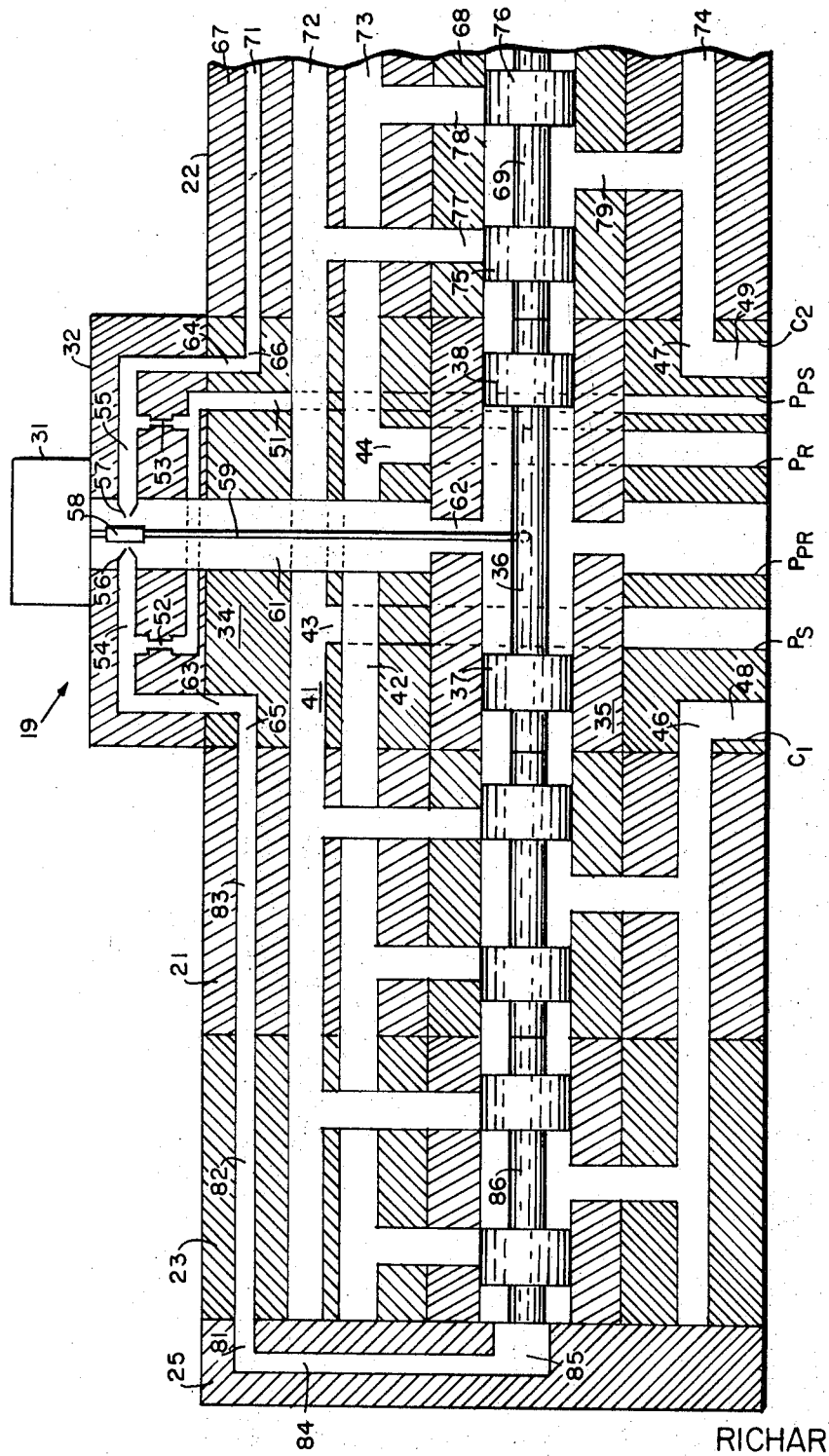
FIG. 2 is a schematic cross section view of a valve of the invention.

The control mechanism 19 comprises a force motor portion 31, a pilot portion 32 and a manifold 33. As best shown in FIG. 2, the manifold portion 33 comprises a block 34 formed with an axial bore surrounding a sleeve 35 which in turn is also formed with an axial bore which contains a valve spool 36. The latter is formed with two enlarged portions or lobes 37 and 38 which serve to guide the spool 36 in the bore of the sleeves 35. The block 34 is formed with axially extending passageways 41 and 42 which, as shown, extend completely through the block 34. Also formed in the block 34 are auxiliary passageways or ports 43 and 44 which connect the passageways 41 and 42 to the lines $P_s$ and $P_r$ respectively. The block 34 is also formed with axially extending passageways 46 and 47, each of which extends to but one side of the block and which connect with auxiliary passageways 48 and 49 respectively which in turn are in communication with lines $C_1$ and $C_2$ respectively.

An auxiliary pasageway 51 formed in block 34 connects line $P_{ps}$ with the pilot stage portion 32. More particularly, passageway 51 communicates with two restrictions 52 and 53 which in turn lead to passageways 54 and 55 respectively. These passageways terminate, at one end, in orifices 56 and 57 respectively. These orifices are positioned adjacent to but on opposite sides of a vane or flapper 58 mounted on a wand 59 one end of which is connected to the force motor 31 and the other end of which extends through passageways 61 and 62 in the block 34 and sleeve 35 respectively and is fastened to the spool 36. The passageway 62 communicates with the line $P_{pr}$.

The passageways 54 and 55 extend, in directions away from the orifices 56, 57 and the restrictions 52, 53, downwardly so as to communicate with auxiliary passageways 63 and 64 in the block 34 which in turn communicates with axially extending passageways 65 and 66, each of which extends to one end of the block 34.

The module 22 is typical and comprises a block 67 formed with a bore containing a sleeve 68 also formed with a bore and containing a spool 69. The block 67 and sleeve 68 are of substantially the same dimensions as the block 34 and sleeve 35 in directions perpendicular to the spools 36 and 69, that is, radially, so that corresponding portions of the two blocks 67 and 34, the two sleeves 35 and 68 and the two spools 36 and 69 are in alignment. The block 67 is formed with axially extending passageways 71, 72, 73 and 74 which extend completely through the block 67 and are in alignment with the passageways 66, 41, 42 and 47 respectively. The spool 69 is formed with two lobes 75 and 76 which cooperate with radially extending ports or passageways 77, 78 and 79 formed in the sleeve 68 and block 67 and which communicate with axially extending passageways 72, 73 and 74 respectively.

The modules 21 and 23 are each similar, and preferably identical, to the module 22, simply being rotated 180° with respect thereto. During manufacture, each module is adjusted to its null position as shown in the drawing with the lobes of the spools occluding the ports leading to the fluid supply lines $P_s$ and $P_r$ and then the block, the sleeve and the spool are all machined to be exactly the same axial length. The control mechanism 19 is similarly machined, but no adjustment for null is involved.

The end cap 25 is typical and is formed with an axially extending passageway 81 in alignment with corresponding passageways 82 and 83 in modules 23 and 21 respecively which in turn communicate with the passageway 65 in the control mechanism 19. The passageway 81 communicates with a radially extending passageway 84 which in turn communicates with a chamber 85 so located as to be opposite to the end of the spool 86 in the module 23. The chamber 85 extends to the surface of the end cap 25 and is in communication with the chamber formed by the bore in the module 25 and the end of the spool 86. Thus, the pressure in the passageway 54 in the control mechanism is transmitted to the end of the piston 86. Similarly, the pressure in the passageway 55 is transmitted, via end cap 26, to the end of the piston in the module 24. The end caps 25 and 26 close off the remaining axially passageways in modules 23 and 24, that is, the passageways connected to the lines $P_s$, $P_r$, $C_1$ and $C_2$.

The control mechainsm 19, the modules 21–24 and the end caps 25, 26 are fastened together in abutting relationship in the relative positions shown, by any appropriate arrangement. Suitable fluid seals, such as face seals or quill seals, must be provided between adjacent faces. The type of fasteners and seals are selected in accordance with the use to be made of the valve and the fluid pressures involved. However, since the details of such fasteners and seals are well known and form no part of the present invention, they have been omitted from the drawing in order to show the remaining parts more clearly. Similarly, all of the axially extending passageways have been shown, in the schematic illustration of FIG. 2, as if they were all in the same plane while it is usually preferable to distribute them more uniformly about the axis of the spools. Additionally, the force motor 31 has been shown in outline only because it is of conventional construction and simply serves to respond to an applied signal by displacing the flapper 58 in the appropriate direction, toward one of the orifices 56, 57 and away from the other.

Let it be assumed that the lines $P_s$, $P_r$, $P_{ps}$, $P_{pr}$ are connected to appropriate sources of fluid pressure and that $C_1$ and $C_2$ are connected to the actuator 14 as shown. Let it also be assumed that all of the spools as well as the flapper 58 are in their neutral positions as shown and that the load 12 is stationary. When it is desired to move the load 12 to a new position, a signal is applied to the comparing circuit 13 which generates an error signal which energizes the force motor 31 which in turn displaces the flapper 58 in the appropriate direction, for example, to the left as shown in FIG. 2. Such displacement causes an increase in the pressure in the passageway 54 over that in the passageway 55 which increase is transmitted to the chamber 85 and applied to the end of the spool 86.

It will be recalled that the spool 36 and each of the spools in the modules are exactly the same length as their associated sleeves and blocks. Accordingly, when the valve is assembled the various spools are in engagement with each other at their ends. Therefore, the increase in pressure in the chamber 85 acts on the spool 86 displacing it to the right and similarly displacing all the other spools to the right. This connects the line $P_s$ to the control line $C_1$ through each of the modules 21 and 23 and also connects the line $P_r$ to the control line $C_2$ through each of the modules 22 and 24. At the same time the wand 59 is also moved to the right providing negative feedback to the flapper 58 in the pilot stage portion 32. The actuator 14 moves the load 12 to its new position. At the same time a signal indicative of this new position is transmitted to the circuit 13 thus reducing the error signal to zero, and the flapper 58 and all of the spools are returned to their original positions.

It is to be noted that the modules 21 and 23 are effectively in parallel as are the modules 22 and 24. If the valve is to be used with an actuator which requires more fluid than can be provided by these four modules, the valve's capacity may be increased simply by adding another module between the module 23 and the end cap 25 and another one between the module 24 and the end cap 26. It is to be noted that when the capacity of the valve is changed, it is not necessary to alter the connections to the fluid sources or to the load in any way because the control mechanism 19 contains all the necessary manifolds and other fluid connections.

It is to be noted that in the specific embodiment illustrated, each module makes fluid connection with but one of the control lines $C_1$ or $C_2$. It would, of course, be possible to construct each module with a spool having additional lobes cooperating with additional ports so as to make connection with both control lines, but the arrangement illustrated is preferred at present.

Figure 3:
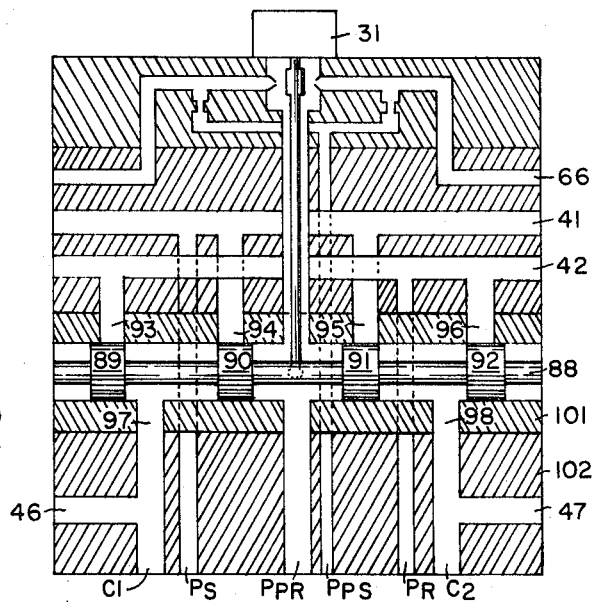
FIG. 3 is a schematic cross section view of a modified form of control mechanism for the valve.

A modified form of control mechanism is illustrated in FIG. 3. This control section is provided with a spool 88 formed with four lobes 89, 90, 91 and 92 which cooperate with six ports 93, 94, 95, 96, 97 and 98 formed in the sleeve 101. The block 102 is formed with a like number of auxiliary, radially extending ports or passageways by which the ports 93 and 96 are connected to passageway 42, ports 94 and 95 are connected to passageway 41, and ports 97 and 98 are connected to control lines $C_1$ and $C_2$ respectively. By this arrangement a complete valve with low flow capability can be assembled by adding a pair of end caps to the control mechanism. The flow capability can be increased by inserting modules, such as previously described, between the control mechanism and the end caps.

It will be apparent from the foregoing description that applicants have provided an improved servo control valve. From a stock comprising standard control mechanisms, standard modules and standard end caps, valves exhibiting a wide range of flow capabilities can be assembled. Inasmuch as all external hydraulic connections are made to the control mechanism, it is not necessary to rearrange manifolds or other hydraulic connections when modules are added or removed to vary the total flow capability. The same stock of spare parts such as modules, spools, etc. serves valves having various flow capabilities.

Although specific embodiments have been described in considerable detail for illustrative purposes, many modifications will occur to those skilled in the art. It is therefore desired that the protection afforded by Letters Patent be limited only by the true scope of the appended claims.

What is claimed is:

1. A servo valve assembly in which a plurality of ports are selectively interconnected by axial movement of one or more spools in response to energization of a control mechanism, characterized in that said valve assembly includes a plurality of valve modules each formed with a plurality of axially extending passageways and each including a spool cooperating with a plurality of radially extending ports, each of said radially extending ports communicating with one of said axially extending passageways, said modules being assembled and connected in abutting relationship to each other and to said control mechanism in quantities selected in accordance with the desired flow capability.

2. A servo valve assembly in accordance with claim 1 in which said control mechanism is formed with passageways for interconnecting said axially extending passageways with external apparatus.

3. A servo valve assembly in accordance with claim 1 in which each of said spools is the same axial length as the remainder of its associated module whereby when said modules are assembled in abutting relationship said spools are also in abutting relationship.

4. A servo valve assembly in accordance with claim 3 in which said control mechanism is provided with a spool of such length and so disposed as to be in abutting relationship with the spools of adjacent modules.

5. A servo valve assembly in accordance with claim 1 in which each of said modules comprises a block formed with a bore and a sleeve within said bore and in which said spool is disposed in a bore in said sleeve.

6. A servo valve assembly in accordance with claim 5 in which said axially extending passageways are formed in said block and said radially extending ports are formed in said sleeve and said block so as to interconnect said bore containing said spool with said axially extending passageways.

7. A servo valve assembly in accordance with claim 6 in which said block, said sleeve and said spool of each module are formed to have the same axial length whereby when said modules are assembled in abutting relationship, the spools in adjacent modules are in engagement with each other.

8. A servo valve assembly in accordance with claim 1 in which said control mechanism includes axially extending passageways in alignment with said passageways in said modules and also includes auxiliary passageways for connecting selected ones of said axially extending passageways to supply and return lines of a source of fluid pressure and to first and second control lines.

9. A servo valve assembly in accordance with claim 8 in which each of said spools is formed with lobes which cooperate with said ports so that upon axial displacement of said spools from a neutral position, said first and second control lines are hydraulically connected to said supply and return lines in a sense dependent upon the sense of the displacement of said spools.

10. A servo valve assembly in accordance with claim 9 in which said modules are assembled in pairs, each module of each pair being operable to connect but one of said control lines selectively to said supply line, to said return line or to neither.

11. A servo valve assembly, comprising:
a control mechanism for developing an amplified force in response to an input signal,
a plurality of valve modules, each formed with a plurality of axially extending passageways and each including a spool cooperating with a plurality of radially extending ports, each of said ports communicating with one of said passageways,
said modules being assembled and connected in abutting relationship to each other and to said control mechanism in quantities selected in accordance with the desired flow capability,
said control mechanism being formed with axial passageways in registration with the passageways of the abutting modules,
said control mechanism also being formed with a plurality of auxiliary passageways, communicating with said axial passageways, for connection to external apparatus, and
a pair of end caps, one connected and fastened to each end of said assembly for coupling said amplified force through one of said passageways to opposite ends of said assembly and for closing the remaining axial passageways.

12. A servo valve asembly in accordance with claim 11 in which each of said spools is the same axial length as the remainder of its associated module whereby when said modules are assembled in abutting relationship, adjacent spools are in engagement with each other.

13. A servo valve assembly in accordance with claim 12 in which said control mechanism includes a spool disposed in a bore and in engagement with the spools of adjacent mdoules.

14. A servo valve assembly in accordance with claim 11 in which each of said modules comprises a block formed with a bore and a sleeve within said bore, said spool being disposed in a bore in said sleeve.

15. A servo valve assembly in accordance with claim 14 in which said axially extending passageways are formd in said block and said radially extending ports are formed in said sleeve and said block to interconnect said axially extending passageways with said bore containing said spool.

16. A servo valve assembly including spool means formed with a plurality of lobes and axially moveable in a bore in response to an input signal so as to selectively connect, through ports communicating with said bore, the supply and return lines of a source of fluid under pressure to first and second load control lines, characterized in that:
said valve assembly includes:
(A) a plurality of modules each including a plurality of axially extending passageways and each including a spool axially moveable in a bore so as to selectively interconnect, through ports communicating with said bore, various of said passageways,
(B) a control mechanism including a plurality of axially extending passageways corresponding to the passageways in said modules, a spool axially moveable in a bore, a plurality of auxiliary passageways for interconnecting said axially extending passageways with said supply and return lines and with said load control lines, and means responsive to said input signal for developing a presure differential and for applying same to a pair of said axilaly extending passageways,
said valve asembly comprising one or more of said modules disposed on either side of said control mechanism with the axially extending passageways therein in registration with those in said modules and with said spools in said control mechanism and said modules in axially abutting relationship, said valve assembly further including,
(C) a pair of end caps one on either end of the assembly of modules, for transmitting said pressure differential existing in said pair of passageways to those ends of those spools which are remote from said control mechanism and for closing the remaining axially extending passageways, whereby, the flow capability of said servo valve assembly depends upon the number of modules included in the assembly.

17. A servo valve assembly in accordance with claim 16 in which each of said modules comprises a block formed with a bore and a sleeve within said bore, said spool being disposed in a bore in said sleeve.

18. A servo valve assembly in accordance with claim 17 in which said axially extending passageways are formed in said block and said radially extending ports are formed in said sleeve and said block to interconnect said axially extending passageways with said bore containing said sleeve.

References Cited

UNITED STATES PATENTS

| | | | |
|---|---|---|---|
| 2,475,298 | 7/1949 | Sloane | 137—625.69 X |
| 2,832,318 | 4/1958 | Paine | 137—625.62 |
| 2,834,368 | 5/1958 | Gray | 251—367 X |
| 2,928,380 | 3/1960 | Krapf | 137—625.69 |
| 3,202,170 | 8/1965 | Holbrook | 137—269 |
| 3,406,721 | 8/1968 | Jenney | 137—625.69 |

M. CARY NELSON, Primary Examiner

R. B. ROTHMAN, Assistant Examiner

U.S. Cl. X.R.

137—625.37, 625.62